US005657972A

United States Patent [19]

Blatt

[11] Patent Number: 5,657,972

[45] Date of Patent: Aug. 19, 1997

[54] CLAMP WITH INFLATABLE BLADDER

[75] Inventor: John A. Blatt, Grosse Pointe Shores, Mich.

[73] Assignee: ISI Norgren, Inc., Anoka, Minn.

[21] Appl. No.: 362,798

[22] Filed: Dec. 22, 1994

[51] Int. Cl.[6] .......... B23Q 3/08

[52] U.S. Cl. .......... 269/22; 269/32; 269/329

[58] Field of Search .......... 269/24, 25, 27, 269/32, 26, 91, 93, 94, 224, 228, 239, 266, 329, 22; 254/93 HP

[56] References Cited

U.S. PATENT DOCUMENTS

| | | | |
|---|---|---|---|
| 412,479 | 10/1889 | Davis . | |
| 2,519,661 | 8/1950 | Johnson | 269/22 |
| 2,712,160 | 7/1955 | Sterczek | 18/55.05 |
| 2,852,463 | 9/1958 | Gutzmer | 204/242 |
| 3,345,897 | 10/1967 | Pearson | 269/22 |
| 3,412,991 | 11/1968 | De Naples, Jr. et al. | 269/22 |
| 3,449,008 | 6/1969 | Colechia | 269/22 |
| 3,490,759 | 1/1970 | Troutner | 269/22 |
| 3,915,436 | 10/1975 | Matson | 269/22 |
| 4,143,448 | 3/1979 | Caster et al. | 29/157.3 |
| 4,253,480 | 3/1981 | Kessel et al. | 137/102 |
| 4,284,267 | 8/1981 | Marben | 269/266 |
| 4,286,490 | 9/1981 | Spengler | 83/453 |
| 4,343,115 | 8/1982 | Stabler et al. | 451/451 |
| 4,570,913 | 2/1986 | Rosser | 269/22 |
| 4,696,635 | 9/1987 | Ohtani et al. | 425/330 |
| 4,770,095 | 9/1988 | Schofield | 254/93 HP |
| 4,813,657 | 3/1989 | Todd | 269/22 |
| 4,905,973 | 3/1990 | Blatt | 269/32 |
| 5,279,493 | 1/1994 | Halder | 269/329 |
| 5,316,202 | 5/1994 | Murray et al. | 269/311 |

*Primary Examiner*—Robert C. Watson
*Assistant Examiner*—Thomas W. Lynch
*Attorney, Agent, or Firm*—Young & Basile, P.C.

[57] ABSTRACT

A clamp secures a workpiece relative to a work piece support. A clamp arm is connected to an external end of the clamp for movement between workpiece clamping and release positions. An inflatable bladder disposed within a bladder support is releasably attached to the clamp arm between the workpiece and the clamp arm. A proportional regulator controls the inflation of the bladder, so that when the bladder is inflated, the bladder provides uniform distribution of the pressure to be exerted along a greater portion of the workpiece to protect the workpiece surface from undesirable indentations or defects.

5 Claims, 3 Drawing Sheets

CLAMP WITH INFLATABLE BLADDER

FIELD OF THE INVENTION

The present invention relates to a clamping device used to clamp sheet metal for assembly fastening or welding having an inflatable bladder which provides further clamping pressure to the work.

BACKGROUND OF THE INVENTION

Power clamps are known of the type in which a fluid motor actuated reciprocating movement is adapted to be translated into a swinging movement of a clamp arm attached by an additional linkage or other force transmitting means to the end of a piston rod of the fluid motor. Normally, in the retracted position of the fluid motor, the clamp is in the released position. That is, the clamp is removed from the work supporting surface and by means of fluid pressure the clamp arm is pivotally moved into operating, i.e. clamping position, to clamp a workpiece, such as sheet metal, to a work supporting surface and securely holding the workpiece there by means of fluid pressure in the fluid motor. Unfortunately, the high forces often developed during clamping along with misalignment of part contoured contact blocks (NC blocks), can damage critical part surfaces, and metal position during clamping can dramatically affect geometry of finished weldment, especially in the case of automotive body-in-white sub-assemblies, and consequently, final assembly.

In particular applications, such as automotive or aerospace applications, the skin or outer surface of a workpiece is required to be smooth and free of any undesired indentations or defects. Therefore, the conventional high contact force clamp devices do not provide an acceptable solution to concerns associated with a particular industry.

Therefore, it is highly desirable to have a clamp device and a means for using it for overcoming the problems associated with the high pressure contacts of the known clamp device. It is desirable to have a clamp device that controls shifting of the workpiece during assembly operations while at the same time protecting the workpiece from undesirable indentations or defects upon its surface. Finally, it is highly desirable to have a clamp device with an accurate and inexpensive means of identifying and adjusting clamp force during the assembly process.

SUMMARY OF THE INVENTION

The present invention provides for a fluid motor operating power clamp wherein the rectilinear reciprocal motion of a piston and a linkage associated therewith is transmitted to a pivotally mounted clamp. The power clamp is provided with an externally mounted adjustable clamp arm. The clamp arm is actuated by movement of the piston within the cylinder (fluid motor) to clamp the workpiece between the clamp arm and a support surface. The clamp arm carries an inflatable bladder that is interposed between the clamp arm and the workpiece. After the clamp arm is driven to the fully clamped position, compressed air is supplied to the inflatable bladder to conform the surface of the bladder to the shape of the workpiece, and to provide further clamping pressure on the workpiece adjustable to the pressure supplied to the inflatable bladder.

The intent of the "bladder clamp" is to control the amount of force against the workpiece by utilizing a directional valve, a zero to 10 volt dc signal, a proportional regulator and a clamp with an inflatable bladder. The unique feature of the "bladder clamp" is the bladder and proportional valve. It allows the clamp force to be selected and maintained for what is required to properly hold the workpiece, and it also allows the bladder to assume the shape of the workpiece which eliminates the need for expensive NC blocks.

In the preferred embodiment, the clamp arm contains the releasably retained bladder on the clamp arm in the direction toward the workpiece. The workpiece is engaged frictionally between the bladder and a support. In use, the clamp arm holds the workpiece in place against the support. The inflatable bladder can then be inflated through a compressed air supply to provide uniform distribution of the pressure to be exerted along a greater portion of the workpiece. The inflatable bladder is adaptable to receive and to engage workpieces of various shapes, weights and thicknesses without making undesirable impressions thereon and without damaging such workpieces. The resilient composition of the inflatable bladder enables the clamp arm to retain workpieces having irregular and complex shapes without causing damages thereto. In addition, programmable variation of clamp force can produce such dramatic effects and allow the geometry of the weldment to be tuned during the process.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
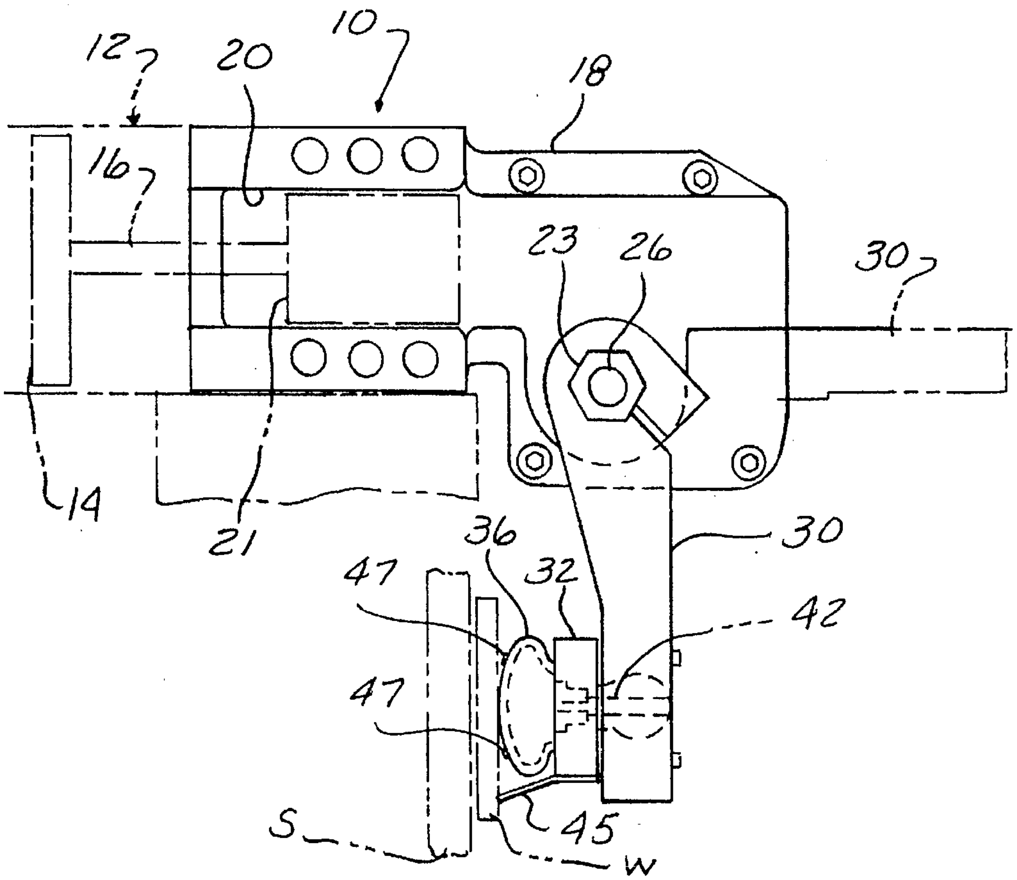
FIG. 1 is a side view of a power clamp having a bladder disposed between a clamp arm and a workpiece.
Figure 2:
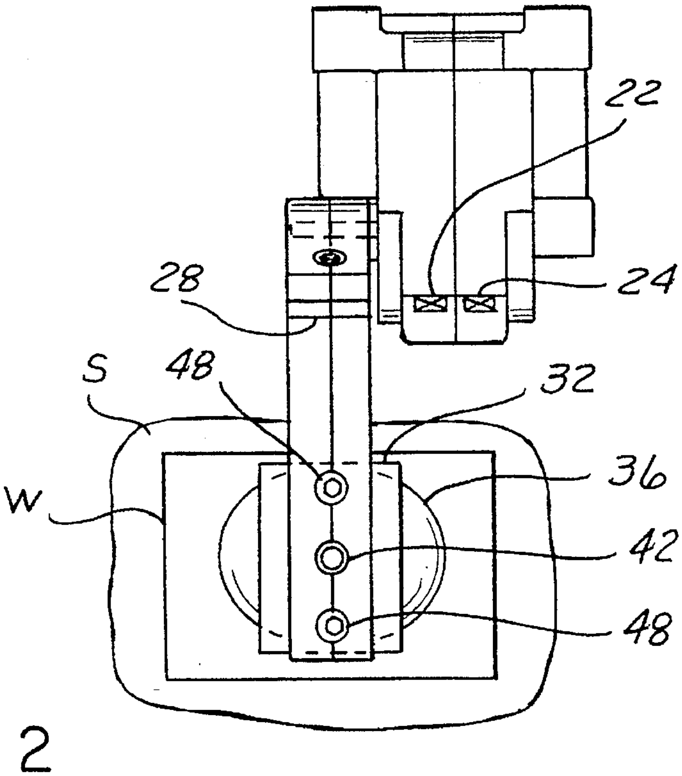
FIG. 2 is an end view of the power clamp.

The inflatable bladder apparatus is adaptable for use with numerous manual and power clamps well known to those skilled in the art. For description purposes, the inflatable bladder apparatus will be discussed herein with non-limiting references to a power clamp with an externally mounted adjustable clamp arm as described in U.S. Pat. No. 4,905,973 issued Mar. 6, 1990; which is incorporated herein by reference. The power clamp assembly 10 according to the present invention is actuated by means of a fluid cylinder 12 having a piston 14 therein which is attached to a piston rod 16. The cylinder 12 has fluid inlets (not shown) which, as is known in the art, are suitably connected by conduits to a source of fluid under pressure. The fluid motor may be manual, hydraulic, or pneumatic or conversely a mechanical reciprocating device may be used to actuate the power clamp by reciprocation of the rod as will be described hereinafter.

Attached to one end of the power cylinder 12 is a hollow housing 18. The housing has an elongated internal guide slot 20 with one end open adjacent the cylinder 12 to receive the free end of the piston rod 16 within the guide slot. The housing also includes a pair of coaxial apertures 22 and 24 having a common axis offset from and perpendicular to a longitudinal axis of the guide slot 20. A rod end 21 is connected to the free end of the piston rod 16 for reciprocal movement. The rod end 21 is slidingly guided within the guide slot 20.

A pivot pin 26 is rotatably disposed within the pair of coaxial apertures 22 and 24 for angular movement about the common axis. The pivot pin 26 has an end 28 extending externally from the housing.

A clamp arm 30 is connected to the external end 28 of the pivot pin 26 for movement between work place clamping and release positions. In the workpiece clamping position the clamp arm 30 holds a workpiece W against a workpiece support S. Reciprocal movements of the rod end 21 under the control of the cylinder assembly 12 and piston rod 16 functioning through links and the pivot pin 26 move the clamp arm 30 from one position to another position. Shaped mating surface means 23 are formed on the clamp arm 30 in the external end 28 of the pivot pin 26 for adjusting the angular orientation of the clamp arm 30 with respect to the clamping position without disassembling the housing 18. In the preferred embodiment, the shaped mating surface 23 means can include a polygonal surface such as a hexagonal or octagonal surface formed on the external end 28 of the pivotal pin 26 and a mating polygonal aperture, such as a hexagonal or octagonal aperture formed in the clamp arm 30. The mating surfaces allow the clamp arm 30 to be adjusted into a variety of positions without disassembling the housing 18. This preferred power operated clamp 10 provides angular movement of the clamp arm 30 from the clamping position to the release position in the range of approximately 120°.

Releasably attached to the clamp arm 30 is a rigid bladder support 32. The bladder support 32 has one side secured adjacent to the clamp arm 30 and an opposing side having a cut-out portion 34. A bladder 36 has a first portion 38 that fits snugly within the cut-out portion 34 of the bladder support 32; and has a second portion 40 extending beyond the bladder support 32 that engages the workpiece W. The bladder 36 is generally oval or circular shaped and hollow throughout. It is made of flexible elastomeric materials such as urethane nitrile rubber. Standard air connections 42 are inserted through the bladder support 32 and into the bladder 36 to facilitate the inflation of the bladder 36 from a remote compressed air supply source 44. To protect the bladder 36 from heat and contamination, such as weld flash, a protective skirt or shield 45 can partially or entirely surround the exposed bladder 36. The protective shield 45 may induce a flared end portion, as shown in FIG. 1.

Figure 4:
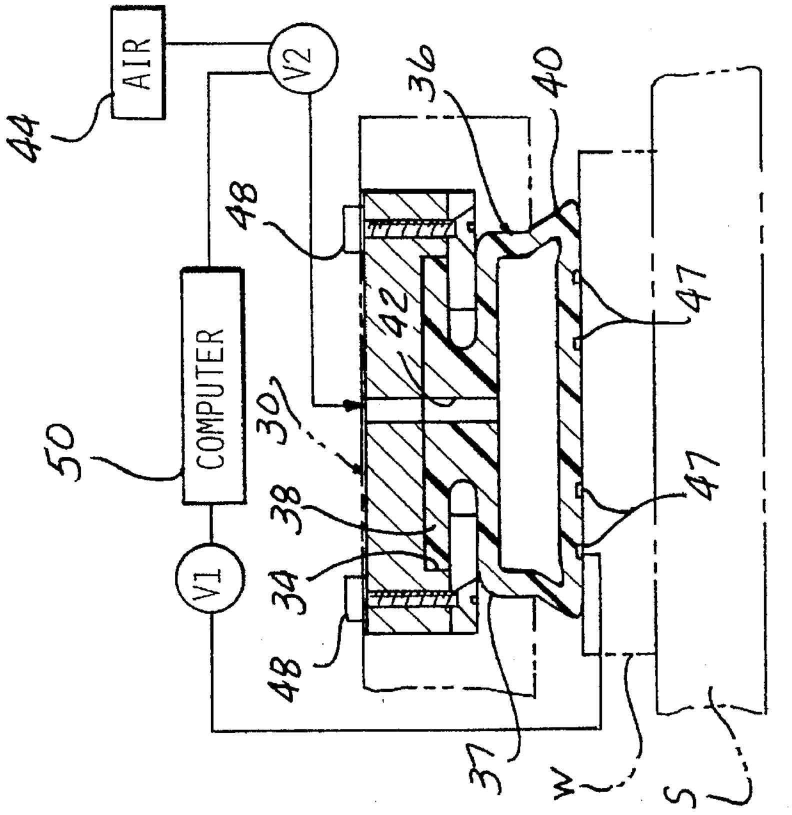
FIG. 4 is a schematic view of the typical system to actuate a second embodiment of the invention, wherein the bladder is located in a recessed portion of the clamp.
Figure 3:
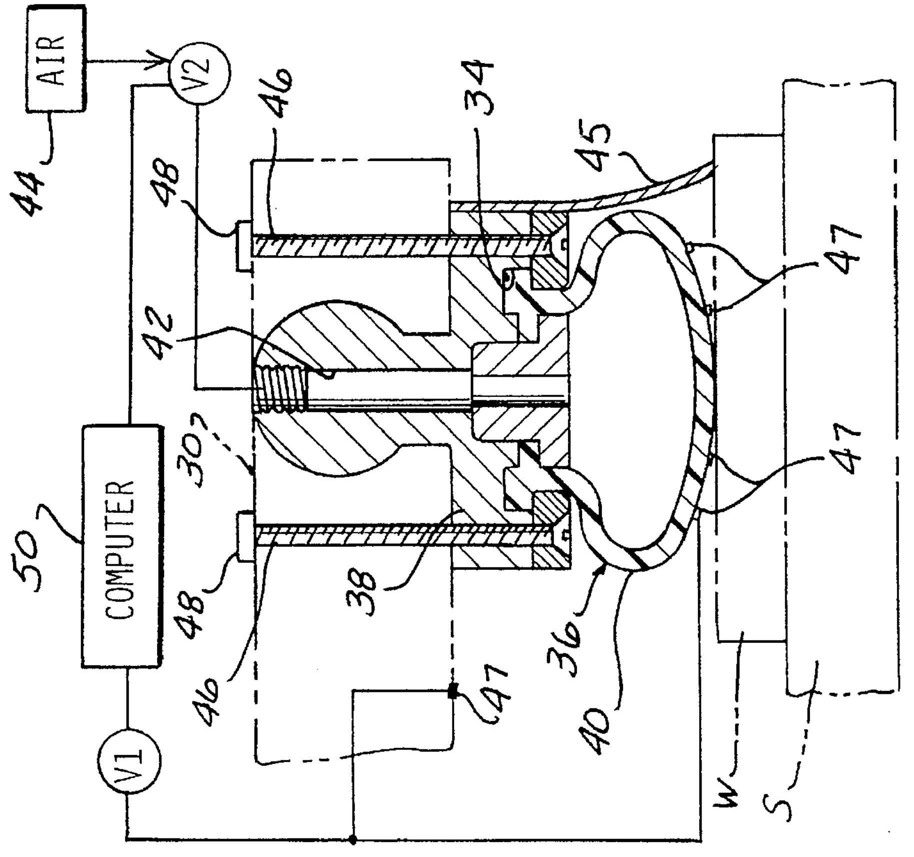
FIG. 3 is a schematic view of a typical system to actuate the clamp and bladder.

A second embodiment as seen in FIG. 4 discloses a bladder 36 generally located within a recessed portion 37 of the clamp. Here the bladder 36 takes the shape of the recessed portion 37. The bladder support is internal to the clamp arm 30 and can be releasably secured inside the recessed portion 37. FIG. 4 also shows the bladder partially inflated against the workpiece W.

In general the bladder support 32 containing the bladder 36 is attached to the clamp arm 30 by mounting means. The mounting means in the preferred embodiment are slots 46 through the clamp arm 30 that are matingly engageable with mounting bolts 48. The power operated clamp 10 secures a workpiece W relative to a workpiece support S having the bladder apparatus 36 disposed between the clamp arm 30 and the workpiece W.

A computer 50 actuates and monitors the force of clamp arm 30 on the workpiece W. Sensors 47 can be located in the clamp arm 30, the bladder 36, or both to determine the force generated; and to feed the information to the computer 50. After predetermined parameters are met, the computer 50 actuates the air supply through valve V2 to the bladder 36. The bladder 36 is inflated to a predetermined pressure as monitored by the sensors 47 via valve V1 and computer 50 for distributing the clamping force over a predetermined area of the workpiece. As an alternative, the bladder 36 can be inflated to a predetermined pressure before a final clamping force is applied to the clamp. The clamp 10 holds the workpiece W with more force than is generated by the bladder 36. The bladder normally operates at a pressure of 50–60 p.s.i. Therefore, this clamp and bladder combination provides for a clamp having sufficient holding force, but yet prevents undesirable and unwanted impressions and indentations on the workpiece.

Figure 5:
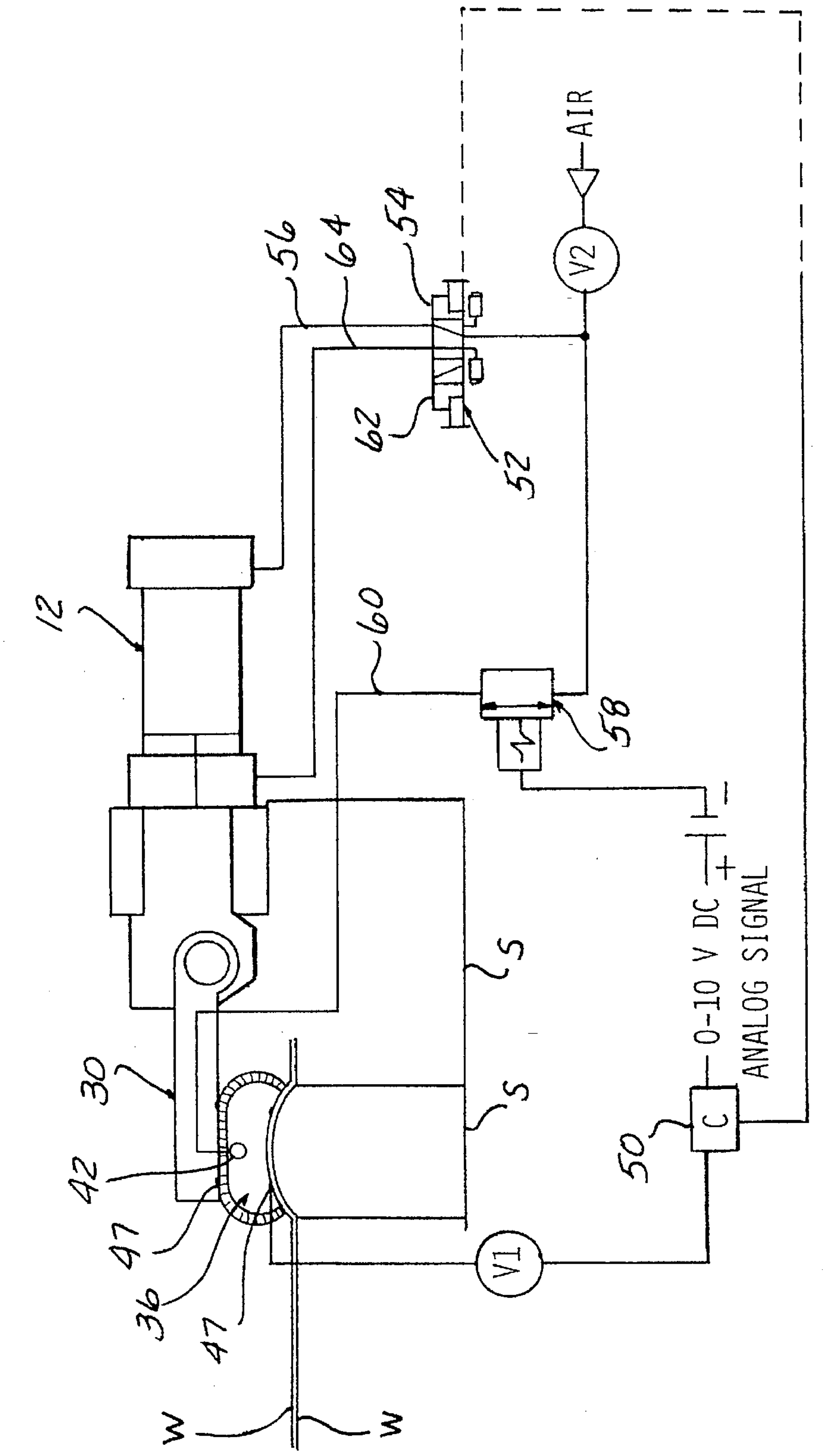
FIG. 5 is a schematic view of the preferred bladder clamp system.

FIG. 5 illustrates the preferred system using the bladder clamp assembly 10, wherein the clamp arm cylinder has two entry ports, a rear port and a front port into the cylinder. When directional valve 52, solenoid 54 is energized, air will flow into air chamber 56 and into a rear port of clamp arm cylinder 12. This causes clamp arm 30 and bladder 36 to swing onto the workpiece W. When clamp arm 30 and bladder 36 are in position, a 0–10 volt dc signal can be given to proportional regulator 58 by computer 50. The air pressure in air chamber 60 and bladder 36 will be proportional to the dc voltage signal applied to proportional regulator 58 (i.e. 1 volt dc equals 10 psi). This pressure will inflate bladder 36 and create a force against the workpiece W and assume the proper shape, while holding workpiece W in position during a weld operation.

After the weld operation is complete, directional valve 52, solenoid 62 will energize causing air to flow into air chamber 64 and a front port of clamp arm cylinder 12 which will swing clamp arm 30 and bladder 36 away from workpiece W. At this time, the dc voltage on proportional regulator 58 can be set to zero by computer 50. This will de-pressurize air chamber 60 and deflate bladder 36. The operation is then complete.

While the inflatable bladder apparatus has been described as being applied to a power clamp, it is believed apparent that the disclosed inflatable bladder apparatus is well adapted for use in other applications in which a clamping device is used for assembly fastening or welding.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A system for controlling the amount of clamping force against a workpiece comprising:

- a clamp having a clamp arm and an inflatable bladder carried by said clamp arm, said clamp arm communicating with an air supply source for selectively moving said clamp arm toward and away from said workpiece and inflating said bladder;
- a means to move the clamp arm and the bladder into position against the workpiece;

a means to inflate the bladder, wherein the means to inflate the bladder includes a source of air pressure; and a means to regulate the inflation of the bladder, wherein the means to regulate the inflation of the bladder is a proportional regulator, wherein the air pressure applied in the bladder will be proportional to a de voltage signal applied to the proportional regulator, wherein the inflation controls the clamping force against the workpiece.

2. The system of claim 1, wherein the the means to move has a cylinder with two entry ports, and the means to move the clamp arm and bladder into position against the workpiece includes a directional valve and solenoid for selectively directing air from the air supply source to one of the two entry ports of the cylinder.

3. The system of claim 1, wherein the bladder is disposed within a recessed portion of the clamp arm.

4. A system for controlling the amount of clamping force against a workpiece comprising:

a clamp having a clamp arm and an inflatable bladder carried by said clamp arm, said clamp arm communicating with an air supply source for selectively moving said clamp arm toward and away from said workpiece and inflating said bladder;

a means to move the clamp arm and the bladder into position against the workpiece;

a means to inflate the bladder; and a means to regulate the inflation of the bladder, wherein the inflation controls the clamping force against the workpiece and wherein a protective shield having a flared end portion surrounds at least a portion of the bladder when it is inflated.

5. A system for controlling the amount of clamping force against a workpiece comprising;

a clamp having a clamp arm and an inflatable bladder carried by said clamp arm, said clamp arm communicating with an air supply source for selectively moving said clamp arm toward and away from said workpiece and inflating said bladder;

a means to move the clamp arm and the bladder into position against the workpiece;

a means to inflate the bladder;

a means to regulate the inflation of the bladder, wherein the inflation controls the clamping force against the workpiece; and a directional valve and solenoid for selectively pivoting the arm of the housing and a proportional regulator for controlling the inflation of the bladder.

* * * * *